May 16, 1967     C. E. BRETERNITZ ET AL     3,319,767

IMPACT COMPENSATING MEANS FOR BELT CONVEYORS

Filed March 4, 1965

Charles E. Breternitz
Alfred I. Dale
Haskell F. Sloan
              INVENTORS

BY Clarence A. O'Brien
and Harvey B. Jacobson
                    Attorneys

United States Patent Office 3,319,767
Patented May 16, 1967

3,319,767
IMPACT COMPENSATING MEANS FOR BELT CONVEYORS
Charles E. Breternitz, Littleton, Colo. (232 Union Station, Denver, Colo.); Alfred I. Dale, 301 Union Station, Denver, Colo.; and Haskell F. Sloan, Englewood, Colo. (301 Union Station, Denver, Colo.)
Filed Mar. 4, 1965, Ser. No. 437,047
1 Claim. (Cl. 198—52)

This invention relates to new and useful improvements in belt conveyors and more particularly to the construction of a loading section of such conveyors which absorbs the impact attendant loading of large or heavy objects onto the belt conveyor. This invention is used as a cushioning device to lessen the impact of materials or goods, falling upon the belt conveyor.

A primary object of this invention is to provide an impact compensating means for belt conveyors which employs a series of rows of springs under a plate positioned under the belt conveyor thereby providing a resilient impact compensating means throughout the length of the impact plate. This compression spring arrangement will add considerably to the cushioning effect incident to the conveyor since wherever contact is made on the impact plate by a package or other material falling on the belt, compression will occur. In other words, the cushioning means of this invention will provide a cushioning effect throughout the area of the entire plate.

A further object of the present invention is to provide a compensating plate for impact which can be mounted at any place along the full length of the conveyor.

A still further object of the present invention is to provide a conveyor impact plate which is supported by the main frame of the conveyor and employs springs for support thereof. The impact plate being supported entirely by the springs, and being disposed entirely under the area where impact is anticipated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
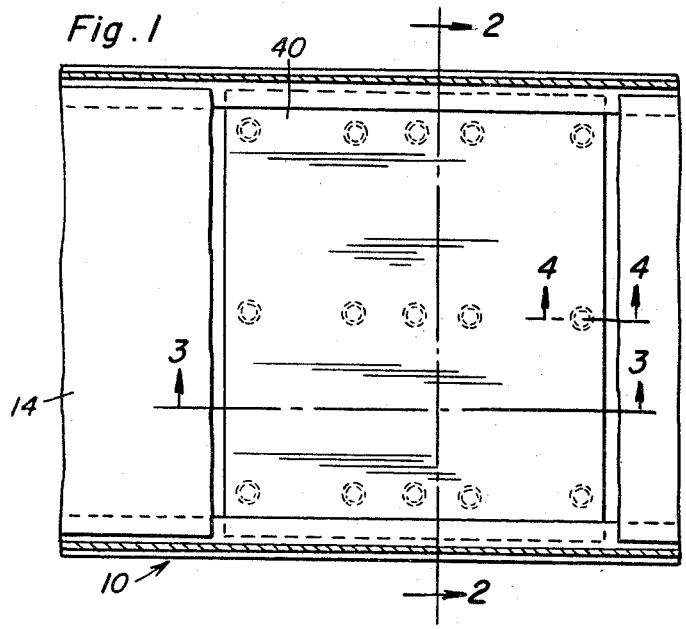
FIGURE 1 is a top plan view of a conveyor using the impact plate compensating means of this invention with the conveyor being broken away to show the impact plate.
Figure 4:
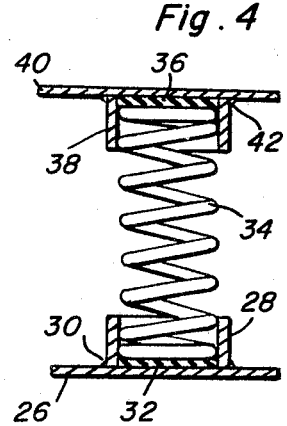
FIGURE 4 is an enlarged sectional view of the impact compensating spring assembly taken substantially along section line 4—4 of FIGURE 1.

Referring now more particularly to the drawings the conveyor 10 is illustrated using the impact compensating means 12 of this invention. The conveyor comprises a belt 14, which is supported by rollers (not shown) and guide angles 16. Side walls 18 for the conveyor are attached to and supported by the guide angles 16. The side walls 18 have flanges 20 at the top thereof which are formed from right angle members.

Figure 2:
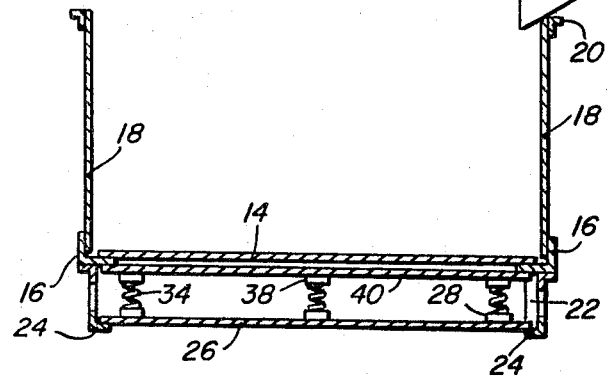
FIGURE 2 is a transverse sectional view of the conveyor and impact plate of this invention taken substantially along section line 2—2 of FIGURE 1, and showing the chute for loading the conveyor.
Figure 3:
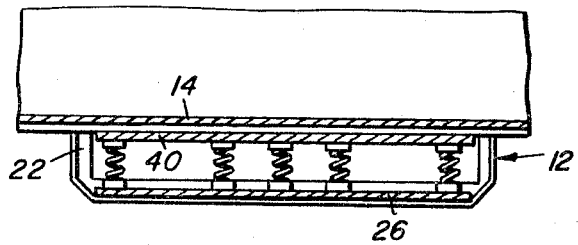
FIGURE 3 is a longitudinal sectional view of the impact compensating means of this invention showing the impact plate and spring arrangement in detail, the section being taken substantially along section line 3—3 of FIGURE 1.

The impact compensating means 12 is secured to and supported by the guide angles 16 by support angles 22 which may be welded to the bottom of the guide angles 16. Support angles 24 secured to the angles 22 carry a flat supporting plate 26. Lower cylindrical sleeves 28 are welded to the supporting plate 26 by conventional welds 30. Disposed within each of the sleeves 28 is a rubber pad 32 and the lower end of a coil spring 34. The coil spring 34 abuts against the rubber pad 32 in the lower sleeve 28 at one end thereof and against a rubber pad 36 in an upper sleeve 38 which is secured to an upper or impact plate 40 by conventional welds 42. The impact plate 40 is shown in FIGURES 1 through 3 as being disposed under but adjacent the conveyor belt 14 and is aligned with a chute 44 which is adapted to discharge heavy objects or materials onto the conveyor belt.

The supporting springs for the impact plate 40 of this invention is shown in a preferred embodiment of FIGURE 1 as comprising three longitudinal rows of five springs, which are positioned under the plate with one spring at each end of the plate, and three springs in the central portion of the plate. This arrangement is considered to be a suitable supporting arrangement for the impact plate in most instances. However, other arrangements may be required by specifications according to the load to be taken by the conveyor belt. The conveyor belt 14 as disclosed herein normally runs along the conveyor guide angles 16. However, under certain load conditions the conveyor belt may engage with the impact plate 40, which will slidingly support the conveyor belt and its load in such instances. The impact plate will compensate for heavy objects such as boxes when they are dropped from the chute onto the conveyor belt thereby avoiding excessive forces on the belt which may damage it.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination, an elongated conveyor belt, said belt including a generally horizontal run adapted to receive and move material, material loading means located in spaced relation to said belt run for discharging material over a material receiving portion of said belt run, and an impact compensating means for the conveyor belt, said impact compensating means comprising upper and lower vertically spaced parallel plates, said lower plate constituting a support plate, said upper plate constituting an impact plate positioned parallel to and immediately below the material receiving portion of the belt run in general alignment with the material loading means, a plurality of upright resilient coiled compression springs extending between said plates at laterally and longitudinally spaced points and constituting the sole means retaining said impact plate in a vertically spaced parallel position over said support plate, said springs being located both at peripherally spaced points about said plates and at predetermined central locations whereby any portion of said impact plate will be provided with substantially immediately adjacent means to resiliently resist movement toward the support plate upon the introduction of a load thereon in response to material being received on said material receiving portion of the belt.

References Cited by the Examiner

UNITED STATES PATENTS

| | | | |
|---|---|---|---|
| 2,239,076 | 4/1941 | Biedess | 198—184 |
| 2,323,368 | 6/1943 | Biedess | 198—204 X |
| 2,785,898 | 3/1957 | Zuercher | 273—43 |
| 3,201,143 | 8/1965 | Drong | 267—33 X |

FOREIGN PATENTS 1,169,367  4/1964  Germany.

EVON C. BLUNK, *Primary Examiner*.

M. L. AJEMAN, *Assistant Examiner*.